(12) United States Patent
Nie et al.

(10) Patent No.: US 11,138,407 B2
(45) Date of Patent: Oct. 5, 2021

(54) FINGERPRINT RECOGNITION MODULE AND MANUFACTURING METHOD THEREFOR, DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Jun Nie, Beijing (CN); Luxia Jiang, Beijing (CN); Wenchu Han, Beijing (CN); Zihe Zhang, Beijing (CN); Jingang Zhang, Beijing (CN); Yachuan Ma, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/644,271

(22) PCT Filed: Mar. 19, 2019

(86) PCT No.: PCT/CN2019/078759
§ 371 (c)(1),
(2) Date: Mar. 4, 2020

(87) PCT Pub. No.: WO2019/179446
PCT Pub. Date: Sep. 26, 2019

(65) Prior Publication Data
US 2021/0064846 A1 Mar. 4, 2021

(30) Foreign Application Priority Data
Mar. 23, 2018 (CN) .......................... 201810246038.5

(51) Int. Cl.
*G06K 9/00* (2006.01)
*G06F 3/044* (2006.01)
*G06F 3/041* (2006.01)

(52) U.S. Cl.
CPC ....... *G06K 9/00053* (2013.01); *G06F 3/0412* (2013.01); *G06F 3/0445* (2019.05); *G06K 9/0002* (2013.01); *G06F 2203/04103* (2013.01)

(58) Field of Classification Search
None
See application file for complete search history.

(56) References Cited

U.S. PATENT DOCUMENTS

2005/0270140 A1 12/2005 Oh
2017/0061193 A1* 3/2017 Young ................. G06K 9/0002
(Continued)

FOREIGN PATENT DOCUMENTS

CN 104700081 A 6/2015
CN 104700084 A 6/2015
(Continued)

OTHER PUBLICATIONS

International search report of PCT application No. PCT/CN2019/078759 dated Jun. 25, 2019.
(Continued)

*Primary Examiner* — Matthew Yeung
(74) *Attorney, Agent, or Firm* — Fay Sharpe LLP (57) ABSTRACT

Provided are a fingerprint recognition module and a manufacturing method therefor, a display panel and a display apparatus. The fingerprint recognition module includes: a substrate, a collection device and a fingerprint recognition circuit, wherein the substrate includes a fingerprint collection surface and a target surface opposite each other, the target surface is provided with a first groove, and the collection device is located in the first groove; and the (Continued)

fingerprint recognition circuit is electrically connected to the collection device, and is configured to collect information of a fingerprint on a side where the fingerprint collection surface is located through the collection device.

19 Claims, 5 Drawing Sheets

(56) References Cited

U.S. PATENT DOCUMENTS

2017/0372112 A1* 12/2017 Baker ................ G06K 9/00053
2018/0052554 A1* 2/2018 Zhang ................ H04M 1/0277
2018/0126704 A1* 5/2018 Zhang ................ C03B 23/203

FOREIGN PATENT DOCUMENTS

| CN | 105205469 A | 12/2015 |
| CN | 108416319 A | 8/2018 |

OTHER PUBLICATIONS

First office action of Chinese application No. 201810246038.5 dated Aug. 5, 2019.

* cited by examiner

FINGERPRINT RECOGNITION MODULE AND MANUFACTURING METHOD THEREFOR, DISPLAY PANEL AND DISPLAY APPARATUS

This application is a 371 of PCT Patent Application No. PCT/CN2019/078759, filed Mar. 19, 2019, and claims priority to Chinese Patent Application No. 201810246038.5, filed Mar. 23, 2018 and entitled "Fingerprint Recognition Module and Manufacturing Method Therefor, Display Panel and Display Apparatus", the entire contents of which are incorporated herein by reference.

TECHNICAL FIELD

The present disclosure relates to the field of display technology, and more particularly to a fingerprint recognition module and a manufacturing method therefor, a display panel and a display apparatus.

BACKGROUND

With the development of science and technology, display apparatuses are applied more and more widely. The display apparatus generally includes a display panel with a fingerprint recognition function.

The display panel with the fingerprint recognition function generally includes a glass substrate and a fingerprint recognition module. The glass substrate is provided with a through hole. The fingerprint recognition module is arranged in the through hole, and generally includes a stacked fingerprint recognition integrated circuit (IC), a collection device and a protective layer.

SUMMARY

The present disclosure provides a fingerprint recognition module and a manufacturing method therefor, a display panel and a display apparatus. The technical solutions are as follows.

In one aspect, a fingerprint recognition module is provided. The fingerprint recognition module includes: a substrate, a collection device and a fingerprint recognition circuit;

the substrate includes a fingerprint collection surface and a target surface opposite to each other, the target surface is provided with a first groove, and the collection device is located in the first groove; and the fingerprint recognition circuit is electrically connected to the collection device, and is configured to collect information of a fingerprint on a side where the fingerprint collection surface is located through the collection device.

Optionally, the collection device is located at a bottom, in a direction towards the fingerprint collection surface, of the first groove.

Optionally, a maximum distance between the bottom, in the direction towards the fingerprint collection surface, of the first groove and the fingerprint collection surface is less than or equal to a maximum distance at which the collection device is capable of collecting fingerprint information.

Optionally, the fingerprint recognition circuit is located on the target surface.

Optionally, the target surface is provided with a second groove, and the fingerprint recognition circuit is located in the second groove.

Optionally, the fingerprint recognition circuit is located in the first groove.

Optionally, an orthographic projection of the fingerprint recognition circuit on the fingerprint collection surface is not overlapped with an orthographic projection of the collection device on the fingerprint collection surface.

Optionally, the first groove includes a plurality of groove surfaces, and a joint of any two of the connected groove surfaces in the plurality of groove surfaces is provided with a first chamfer.

Optionally, the first chamfer is a circular-arc chamfer.

Optionally, the second groove includes a plurality of groove surfaces, and a joint of any two of the connected groove surfaces in the plurality of groove surfaces is provided with a second chamfer.

Optionally, the second chamfer is a circular-arc chamfer.

Optionally, a thickness of the substrate is 0.5 mm, and the maximum distance between the bottom, in the direction towards the fingerprint collection surface, of the first groove and the fingerprint collection surface is less than or equal to 0.3 mm.

Optionally, the collection device includes a first electrode layer, a first insulation layer, a second electrode layer, a second insulation layer and an ink layer which are sequentially stacked in a direction away from the fingerprint collection surface.

Optionally, the substrate is a transparent substrate.

Optionally, the collection device is located at a bottom, in a direction towards the fingerprint collection surface, of the first groove, and a maximum distance between the bottom, in the direction towards the fingerprint collection surface, of the first groove and the fingerprint collection surface is less than or equal to a maximum distance at which the collection device is capable of performing fingerprint information collection;

the target surface is further provided with a second groove, and the fingerprint recognition circuit is located in the second groove;

the first groove includes a plurality of groove surfaces, and a joint of any two of the connected groove surfaces in the plurality of groove surfaces is provided with a first chamfer, the first chamfer being a circular-arc chamfer;

the second groove includes a plurality of groove surfaces, and a joint of any two of the connected groove surfaces in the plurality of groove surfaces is provided with a second chamfer, the second chamfer being a circular-arc chamfer; and the collection device includes a first electrode layer, a first insulation layer, a second electrode layer, a second insulation layer and an ink layer which are sequentially stacked in a direction away from the fingerprint collection surface.

In another aspect, a manufacturing method for a fingerprint recognition module is provided. The method includes:

providing a substrate, the substrate comprising a fingerprint collection surface and a target surface opposite to each other;

forming a first groove on the target surface of the substrate;

arranging a collection device in the first groove;

providing a fingerprint recognition circuit; and electrically connecting the fingerprint recognition circuit to the collection device, the fingerprint recognition circuit being configured to collect information of a fingerprint on a side where the fingerprint collection surface is located through the collection device.

Optionally, the method further includes:

arranging the fingerprint recognition circuit on the target surface.

In another aspect, a display panel is provided. The display panel includes a fingerprint recognition module, the fingerprint recognition module includes a substrate, a collection device and a fingerprint recognition circuit; the substrate includes a fingerprint collection surface and a target surface opposite to each other, the target surface is provided with a first groove, and the collection device is located in the first groove; and the fingerprint recognition circuit is electrically connected to the collection device, and is configured to collect information of a fingerprint on a side where the fingerprint collection surface is located through the collection device.

Optionally, the substrate is a transparent substrate; and the display panel includes a transparent cover plate, and the transparent substrate and the transparent cover plate are formed as one piece.

In another aspect, a display apparatus is provided. The display apparatus includes the above display panel.

The technical solutions provided by the present disclosure have the following beneficial effect. Since the collection device is arranged in the first groove on the target surface of the substrate and the target surface is opposite to the fingerprint collection surface that is in contact with an external environment, contact between the collection device and the external environment is avoided, and dustproof and waterproof performance of the fingerprint recognition module is improved.

It is to be understood that both the foregoing general description and the following detailed description are exemplary and explanatory only and are not intended to limit the present disclosure.

BRIEF DESCRIPTION OF THE DRAWINGS

In order to describe the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

The accompanying drawings, which are incorporated in and constitute a part of this specification, illustrate embodiments consistent with the present disclosure and, together with the description, serve to explain the principles of the present disclosure.

DETAILED DESCRIPTION

In order to describe the principles in the present disclosure more clearly, the present disclosure will be described in detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

A display panel with a fingerprint recognition function is applied more and more widely, and generally includes a glass substrate and a fingerprint recognition module. The glass substrate is provided with a through hole, and the fingerprint recognition module is arranged in the through hole. Since the fingerprint recognition module is located in the through hole of the glass substrate and there is a gap between the fingerprint recognition module and the display panel, dust from an external environment can easily enter the gap to be deposited on a collection device, resulting in poorer dustproof and waterproof performance of the fingerprint recognition module in the prior art.

In addition, since the collection device in the fingerprint recognition module is stacked on a fingerprint recognition IC, the collection device is prone to collide with the fingerprint recognition IC in a process of forming the collection device on the fingerprint recognition IC, so as to make the fingerprint recognition IC damaged, and then cause a lower manufacturing yield of the fingerprint recognition module.

Figure 1:
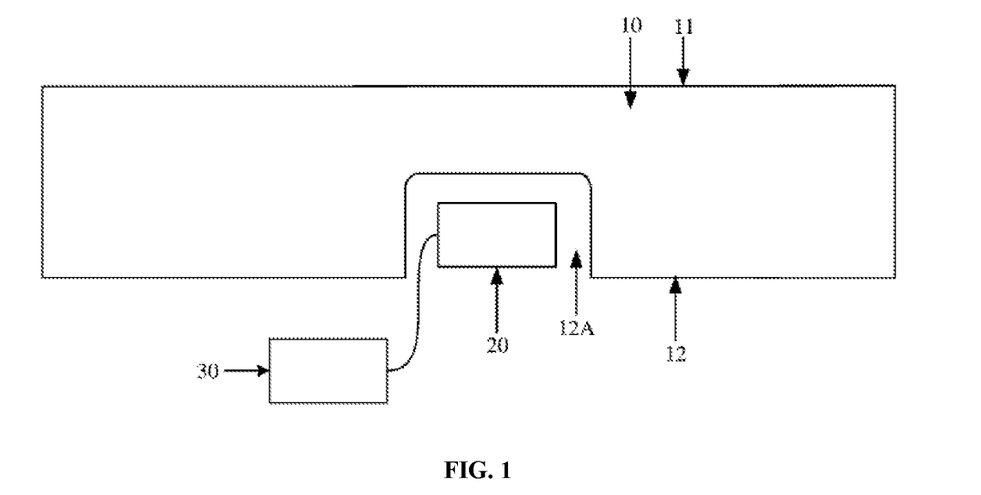
FIG. 1 is a schematic structural diagram of a fingerprint recognition module provided by an embodiment of the present disclosure.

FIG. 1 is a schematic structural diagram of a fingerprint recognition module provided by an embodiment of the present disclosure. As shown in FIG. 1, the fingerprint recognition module may include: a substrate 10, a collection device 20 and a fingerprint recognition circuit 30; the substrate 10 includes a fingerprint collection surface 11 and a target surface 12 opposite to each other, the target surface 12 is provided with a first groove 12A, and the collection device 20 is located in the first groove 12A; the fingerprint recognition circuit 30 is electrically connected to the collection device 20, and is configured to collect information of a fingerprint on a side where the fingerprint collection surface 11 is located through the collection device 20.

In summary, in the fingerprint recognition module provided by the embodiment of the present disclosure, since the collection device is arranged in the first groove on the target surface of the substrate and the target surface is opposite to the fingerprint collection surface that is in contact with an external environment, contact between the collection device and the external environment is avoided, and dustproof and waterproof performance of the fingerprint recognition module is improved.

Figure 2:
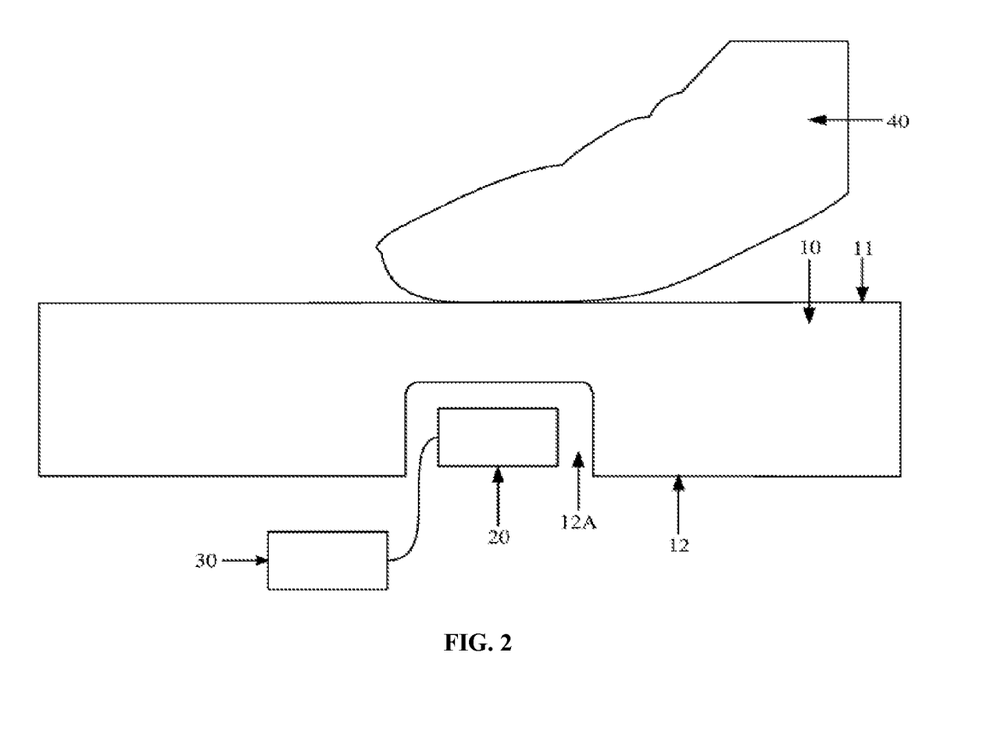
FIG. 2 is a schematic diagram of an application scenario of the fingerprint recognition module shown in FIG. 1 provided by an embodiment of the present disclosure.

FIG. 2 is a schematic diagram of an application scenario of the fingerprint recognition module shown in FIG. 1 provided by an embodiment of the present disclosure. As shown in FIG. 2, when using the fingerprint recognition module, a worker can press his/her finger 40 on a region (the region may be an orthographic projection region of the collection device 20 on the fingerprint collection surface 11, and is not shown in FIG. 2) corresponding to the collection device 20 on the fingerprint collection surface 11. Then, the fingerprint recognition circuit 30 may be controlled to collect fingerprint information of the finger 40 through the collection device 20 (in various existing fingerprint acquisition technologies, such as the capacitive fingerprint acquisition technology and the ultrasonic fingerprint acquisition technology, a fingerprint collection device can collect the fingerprint information of the finger at a certain distance from the finger, so that the collection device on the other side of the substrate can collect the fingerprint information of the finger). It can be seen that in the process of collecting the fingerprint information, the collection device 20 does not need to be in contact with the finger or an external space on the side of the finger, so that the dustproof and waterproof performance of the fingerprint recognition module is higher.

Figure 3:
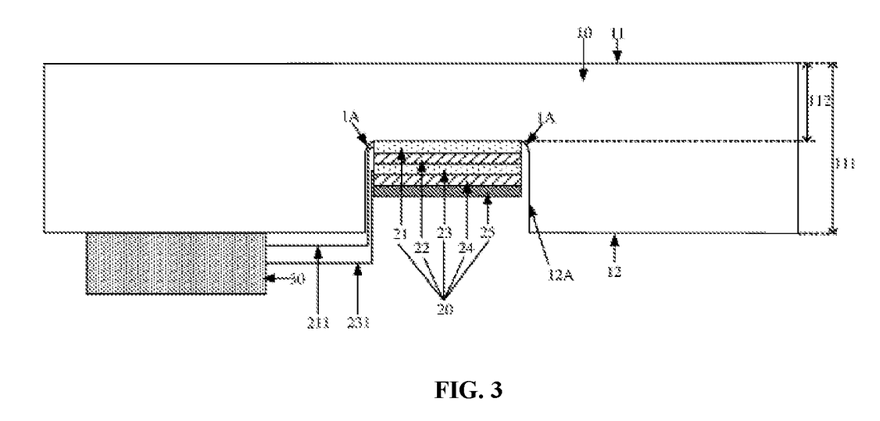
FIG. 3 is a schematic structural diagram of another fingerprint recognition module provided by an embodiment of the present disclosure.

FIG. 3 is a schematic structural diagram of a fingerprint recognition module provided by an embodiment of the present disclosure, and some adjustments are made on the fingerprint recognition module on the basis of the fingerprint recognition module shown in FIG. 1.

Optionally, the fingerprint recognition circuit 30 may be arranged on the target surface 12. A distance between the fingerprint recognition circuit and the collection device 20 can be shortened by arranging the fingerprint recognition circuit 30 on the target surface 12, improving transmission efficiency of the fingerprint information. Moreover, the fingerprint recognition circuit 30 may not be in contact with the substrate 11 by arranging in an external apparatus. For example, when the fingerprint recognition module is applied to a display apparatus, the fingerprint recognition circuit 30 may be arranged in some components (such as various substrates in the display apparatus) of the display apparatus.

Optionally, the first groove 12A includes a plurality of groove surfaces (not shown in FIG. 3), and a joint of any two of the connected groove surfaces in the plurality of groove surfaces is provided with a first chamfer 1A. As a transition structure at the joint of the two surfaces, the chamfer can enlarge an included angle at the joint of the two surfaces and can enable the transition at the joint to be smoother. A wiring may be subsequently arranged in the first groove. With the chamfer, the wiring can be more closely fit with the groove surface of the first groove, thereby improving durability of the wiring.

The plurality of groove surfaces may include a bottom surface and at least one side surface of the first groove. The bottom surface is usually a flat surface (the bottom surface may be in various shapes, such as an oval, a circle and a rectangle), so as to facilitate the arrangement of the collection device. The side surface may be a curved surface or a flat surface. A joint between the bottom surface and the side surface may be provided with a chamfer. When the side surfaces are multiple flat surfaces, a joint of every two flat surfaces in the multiple flat surfaces may be provided with a chamfer.

Optionally, the first chamfer 1A is a circular-arc chamfer. The circular-arc chamfer may be considered as an arc surface connected to two groove surfaces, respectively. The circular-arc chamfer can disperse stress between two connected groove surfaces, so that the substrate 10 can be prevented from being broken due to excessive concentration of the stress at the first groove 12A.

Optionally, the collection device 20 is located at the bottom, in a direction towards the fingerprint collection surface 11 (not shown in FIG. 3), of the first groove 12A. In this way, the distance between the collection device and the fingerprint collection surface can be shortened, facilitating the fingerprint information collection by the collection device.

The collection device generally has a maximum distance at which the fingerprint information can be collected. If a distance between the collection device and the fingerprint of the finger is greater than the maximum distance at which the fingerprint information can be collected, the collection device may be difficult to collect the fingerprint information normally. If the distance between the collection device and the fingerprint of the finger is less than or equal to the maximum distance at which the information of the fingerprint can be collected, the collection device can collect the fingerprint information normally. Therefore, a maximum distance (which is a distance between the bottom and the fingerprint collection surface when the bottom is flat and parallel to the fingerprint collection surface) between the bottom of the first groove 12A and the fingerprint collection surface 11 may be less than or equal to the maximum distance of the collection device 20 at which the fingerprint information can be collected, so that the collection device 20 can collect the fingerprint information normally.

In an exemplary example, a thickness 111 of the substrate 10 may be 0.5 mm. A distance 112 between the bottom surface (not shown in FIG. 3) of the first groove 12A and the fingerprint collection surface 11 may be less than or equal to 0.3 mm (for example, 0.23 mm), and the collection device 20 is in contact with the bottom surface of the first groove 12A.

Moreover, the thickness of the substrate 10 may be any other thicknesses. For example, the thickness of the substrate 10 is 0.8 mm. The distance 112 between the bottom surface (not shown in FIG. 3) of the first groove 12A and the fingerprint collection surface 11 may be another value as long as it can ensure that the collection device 20 located in the first groove can collect the information of the fingerprint on the side where the fingerprint collection surface is located.

Optionally, the collection device 20 may include a first electrode layer 21, a first insulation layer 22, a second electrode layer 23, a second insulation layer 24 and an ink layer 25 which are sequentially stacked in a direction (not shown in FIG. 3) away from the fingerprint collection surface 11. The ink layer 25 may be used for light shading to prevent light outside the fingerprint collection surface from entering a portion below the collection device 20.

The substrate 10 may be a transparent substrate. When the substrate 10 is the transparent substrate, the ink layer 25 may be configured to mark a region of the collection device 20 on the fingerprint collection surface 11, so that the user can quickly find the region of the collection device 20 on the fingerprint collection surface 11 when using the fingerprint recognition module. Thus, the fingerprint information can be quickly collected.

Figure 4:
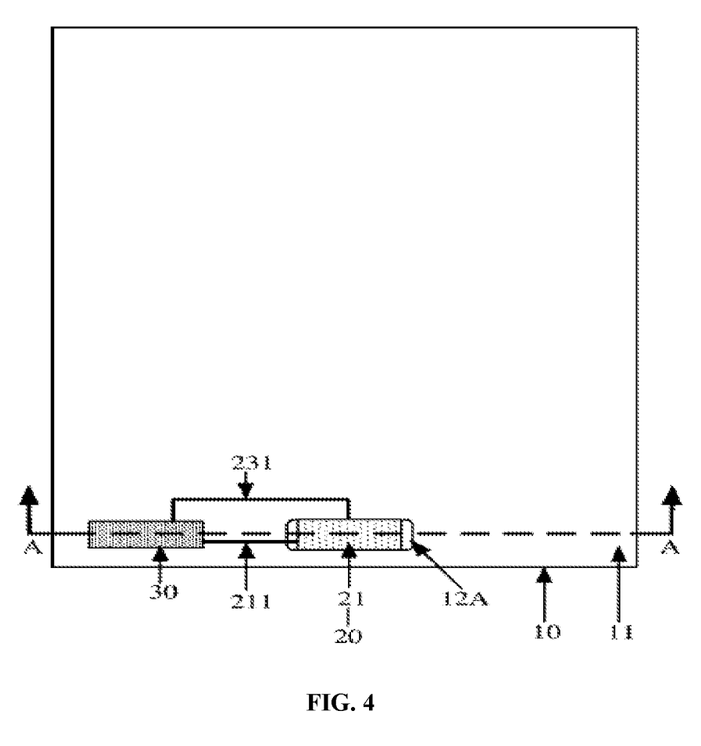
FIG. 4 is a schematic bottom view of the fingerprint recognition module shown in FIG. 3 provided by an embodiment of the present disclosure.

FIG. 4 is a bottom view of the fingerprint recognition module shown in FIG. 3, and FIG. 3 is also a schematic diagram of the section A-A of the fingerprint recognition module in FIG. 4. In combination with FIGS. 3 and 4, the fingerprint recognition circuit 30 may be connected to the first electrode layer 21 through a first signal line 211, and is connected to the second electrode layer 23 through a second signal line 231. Exemplarily, the first electrode layer 21 may include a plurality of signal receiving lines (also known as RX lines); the second electrode layer 23 may include a plurality of signal sending lines (also known as TX lines); and a length direction of the RX lines may be perpendicular to a length direction of the TX lines. The fingerprint recognition circuit 30 is connected to the RX lines through the first signal line L1, and acquires an induction signal of the first electrode layer 21 from the RX lines. The fingerprint recognition circuit 30 may also be connected to the TX lines through the second signal line L2, and sends a drive signal to the TX lines. After the fingerprint recognition module is applied to the display panel, a region above the fingerprint recognition circuit 30 and the collection device 20 in FIG. 4 may be an effective display region of the display panel.

Figure 5:
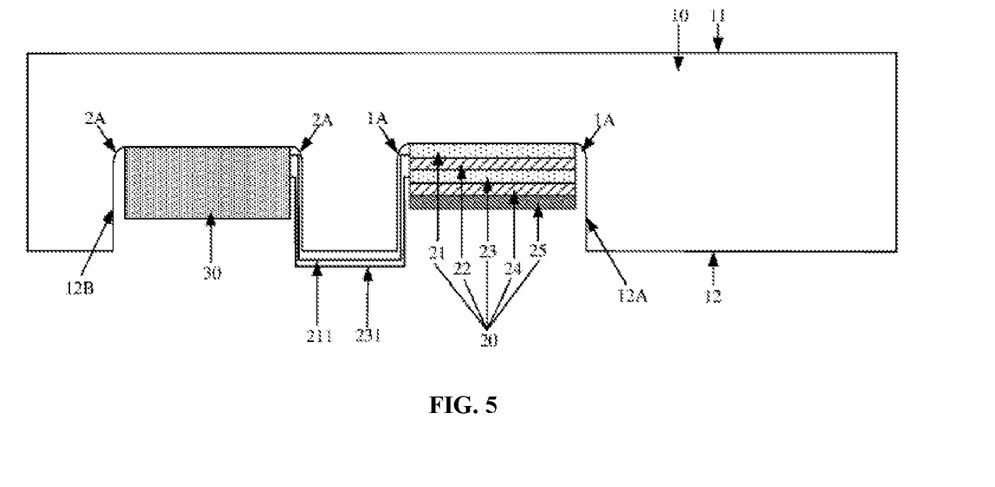
FIG. 5 is a schematic structural diagram of another fingerprint recognition module provided by an embodiment of the present disclosure.

FIG. 5 is a schematic structural diagram of another fingerprint recognition module provided by an embodiment of the present disclosure. As shown in FIG. 5, on the basis of FIG. 3, the target surface 12 of the transparent substrate 10 may be further provided with a second groove 12B, and the fingerprint recognition IC (integrated circuit) 30 may be arranged in the second groove 12B.

Optionally, the second groove 12B includes a plurality of groove surfaces. A joint of any two of the connected groove surfaces in the plurality of groove surfaces is provided with a second chamfer 2A. The second chamfer 2A may be a circular-arc chamfer. The structure of the second chamfer 2A may refer to that of the first chamfer 1A described above, and details thereof are not described herein.

By separately arranging the collection device 20 and the fingerprint recognition IC 30 on the target surface 12, it is possible to prevent the fingerprint recognition IC 30 from being damaged during forming of the collection device on the fingerprint recognition circuit as the collection device 20 and the fingerprint recognition IC 30 are stacked. Thus, the manufacturing yield of the fingerprint recognition module is improved.

Optionally, the fingerprint recognition circuit may be the fingerprint recognition IC which may be arranged on the substrate in a COG (Chip On Glass) manner.

Meanings of other reference numerals in FIG. 5 may refer to those in FIG. 3, and details thereof are not described herein.

Figure 6:
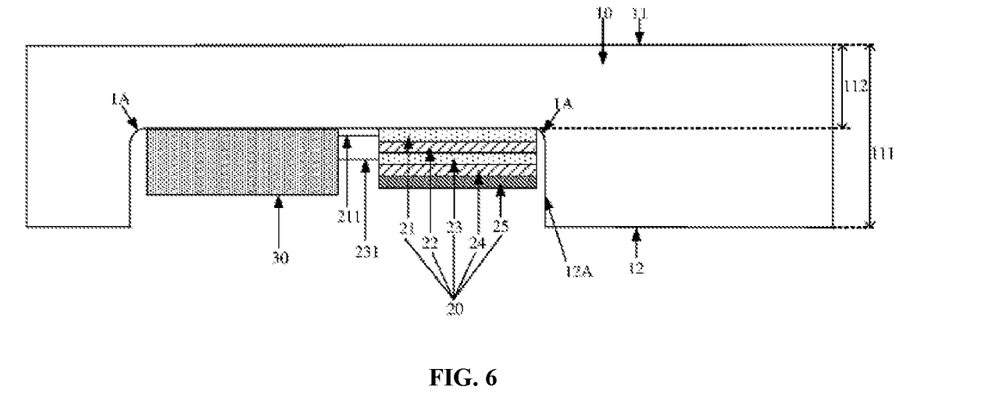
FIG. 6 is a schematic structural diagram of another fingerprint recognition module provided by an embodiment of the present disclosure.

FIG. 6 is a schematic structural diagram of another fingerprint recognition module provided by an embodiment of the present disclosure. In FIG. 6, the fingerprint recognition circuit 30 is located in the first groove 12A. That is, both the fingerprint recognition circuit 30 and the collection device 20 are located in the first groove 12A. In this way, the number of the grooves is reduced, reducing the manufacturing cost.

Optionally, the orthographic projection (not shown in FIG. 6) of the fingerprint recognition circuit 30 on the collection surface is not overlapped with the orthographic projection (not shown in FIG. 6) of the collection device 20 on the fingerprint collection surface 11. That is, the locations of the fingerprint recognition circuit 30 and the collection device 20 in the first groove 12A are not overlapped. In this way, the fingerprint recognition circuit 30 and the collection device 20 will not influence each other when stacking. Meanings of other reference numerals in FIG. 6 may refer to those in FIG. 3, and details thereof are not described herein.

In FIGS. 3, 4, 5 and 6, only the schematic connection of the fingerprint recognition circuit 30 with the first electrode layer 21 and the second electrode layer 23 is taken as an example. The fingerprint recognition circuit and the first electrode layer 21 are connected through a plurality of first signal lines 211; and the fingerprint recognition circuit 30 and the second electrode layer 23 are connected through a plurality of second signal lines 231.

In summary, in the fingerprint recognition module provided by the embodiment of the present disclosure, since the collection device is arranged in the first groove on the target surface of the substrate, and the target surface is opposite to the fingerprint collection surface that is in contact with an external environment, contact between the collection device and the external environment is avoided. Thus, dustproof and waterproof performance of the fingerprint recognition module is improved.

Figure 7:
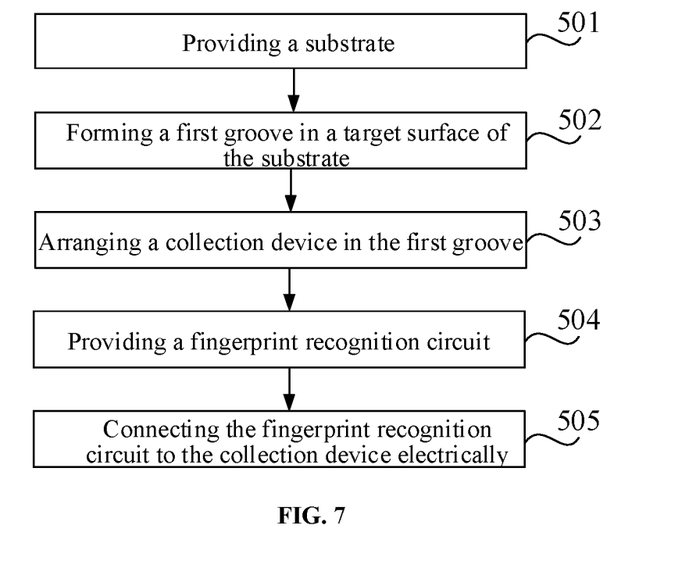
FIG. 7 is a flowchart of a manufacturing method for a fingerprint recognition module provided by an embodiment of the present disclosure.

FIG. 7 is a flowchart of a manufacturing method for a fingerprint recognition module provided by an embodiment of the present disclosure. The manufacturing method for the fingerprint recognition module may be configured to manufacture the fingerprint recognition module shown in FIG. 1 or FIG. 3. As shown in FIG. 7, the manufacturing method for the fingerprint recognition module may include the following steps.

In step 501, a substrate is provided.

The substrate may include a fingerprint collection surface and a target surface opposite to each other.

In step 502, a first groove is formed on the target surface of the substrate.

In step 503, a collection device is arranged in the first groove.

In step 504, a fingerprint recognition IC (integrated circuit) is provided.

In step 505, the fingerprint recognition circuit is electrically connected to the collection device.

The fingerprint recognition circuit is configured to collect information of a fingerprint on a side where the fingerprint collection surface is located through the collection device.

In summary, in the fingerprint recognition module manufactured by the manufacturing method for the fingerprint recognition module provided by the embodiment of the present disclosure, since the collection device is arranged in the first groove on the target surface of the substrate, and the target surface is opposite to the fingerprint collection surface that is in contact with an external environment, contact between the collection device and the external environment is avoided. Thus, dustproof and waterproof performance of the fingerprint recognition module is improved.

Figure 8:
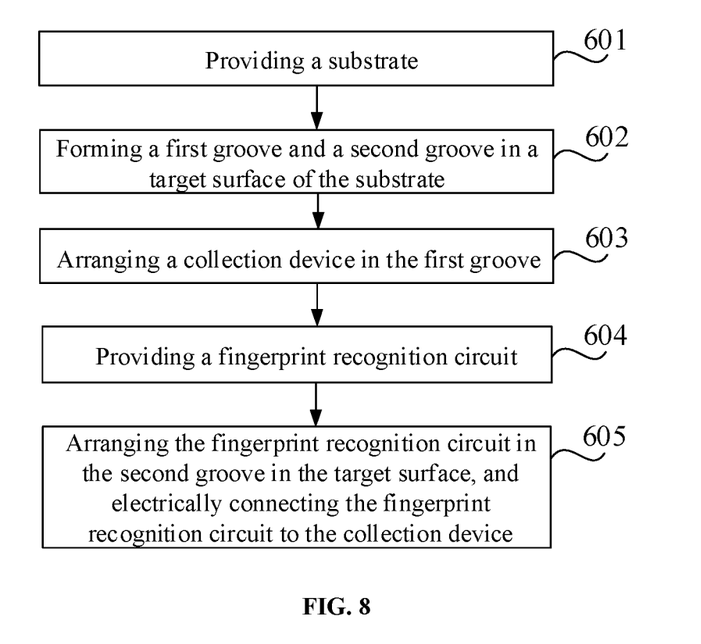
FIG. 8 is a flowchart of another manufacturing method for a fingerprint recognition module provided by an embodiment of the present disclosure.

FIG. 8 is a flowchart of another manufacturing method for a fingerprint recognition module provided by an embodiment of the present disclosure. The manufacturing method for the fingerprint recognition module may be configured to manufacture the fingerprint recognition module shown in FIG. 5. As shown in FIG. 8, the manufacturing method for the fingerprint recognition module may include the following steps.

In step 601, a substrate is provided.

The substrate may include a fingerprint collection surface and a target surface opposite to each other.

In step 602, a first groove and a second groove are formed on the target surface of the substrate.

Forming the first groove and the second groove on the target surface of the transparent substrate in step 602 may be realized through chemical etching or machining.

Optionally, the first groove and the second groove may be formed in one step, or may be formed in two steps, respectively. Exemplarily, the first groove may be formed in step 602, and the second groove may be formed prior to step 605.

Optionally, a joint of any two of the connected groove surfaces in each of the first groove and the second groove formed in step 602 is provided with a chamfer; and the chamfer may be a circular-arc chamfer.

Moreover, when manufacturing the fingerprint recognition module shown in FIG. 6, the first groove may be formed only, without the second groove.

In step 603, a collection device is arranged in the first groove on the target surface.

After the collection device is formed, the collection device may be connected to a fingerprint recognition circuit through a plurality of first signal lines and a plurality of second signal lines. In addition, in a process of forming the collection device in step 603, the plurality of first signal lines and the plurality of second signal lines may be formed simultaneously.

Figure 9:
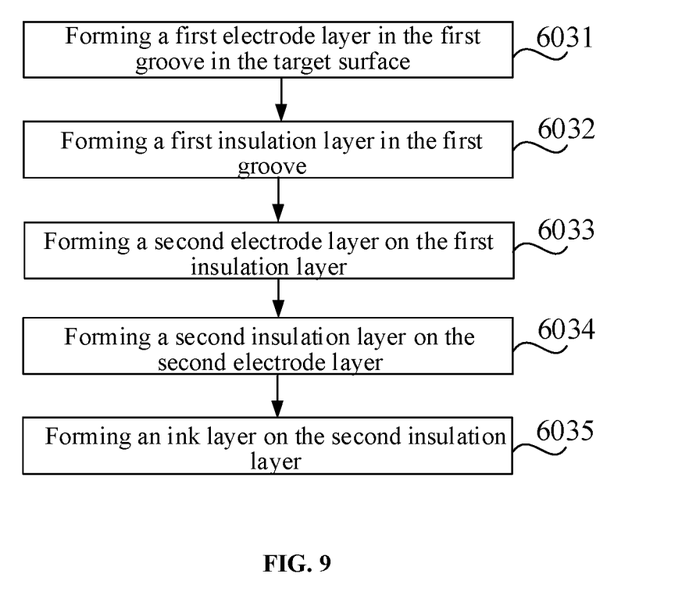
FIG. 9 is a flowchart of a method for forming a collection device provided by an embodiment of the present disclosure.

As shown in FIG. 9, step 603 may include the following five steps.

In step 6031, a first electrode layer is formed in the first groove on the target surface.

Exemplarily, in step 6031, firstly, a first electrode material layer may be formed on the target surface of the transparent substrate, wherein the first electrode material layer may cover the entire target surface. Secondly, the first electrode material layer is coated with a layer of a first photoresist. Thirdly, the first photoresist is exposed with a mask to enable the first photoresist to form a fully-exposed region and a non-exposed region. Fourthly, a development process is employed to remove the first photoresist in the fully-exposed region, and the first photoresist in the non-exposed region is reserved; and a region corresponding to the fully-exposed region on the first electrode material layer is etched, and the first photoresist in the non-exposed region is peeled off after the etching is completed. In this way, the first electrode layer can be formed in the first groove on the target surface, and the plurality of first signal lines is formed outside the first groove.

In step 6032, a first insulation layer is formed on the first electrode layer.

In step 6033, a second electrode layer is formed on the first insulation layer.

Exemplarily, in step 6033, firstly, the target surface of the transparent substrate may be coated with a layer of a second photoresist, and a second electrode material layer is formed on the second photoresist layer, wherein the second photoresist and the second electrode material layer may cover the entire target surface. Secondly, the second electrode material layer is coated with a layer of a third photoresist. Thirdly, the third photoresist is exposed with the mask to enable the third photoresist to form a fully-exposed region and a non-exposed region. Fourthly, the development process is employed to remove the third photoresist in the fully-exposed region, and the third photoresist in the non-exposed region is reserved; a region corresponding to the fully-exposed region on the second electrode material layer is etched, and the second photoresist and the third photoresist in the non-exposed region are peeled off after the etching is completed. In this way, the second electrode layer can be formed on the first insulation layer, and the plurality of second signal lines is formed outside the first groove.

In step 6034, a second insulation layer is formed on the second electrode layer.

In step 6035, an ink layer is formed on the second insulation layer.

In step 604, a fingerprint recognition circuit is provided.

The fingerprint recognition circuit may be a fingerprint recognition IC.

In step 605, the fingerprint recognition circuit is arranged in the second groove on the target surface, and is electrically connected to the collection device.

Exemplarily, in step 605, the fingerprint recognition circuit may be arranged in the second groove; and then, the fingerprint recognition IC is connected to the plurality of first signal lines and the plurality of second signal lines.

When the fingerprint recognition module shown in FIG. 6 is manufactured, the fingerprint recognition circuit may also be arranged in the first groove.

In summary, in the fingerprint recognition module manufactured by the manufacturing method for the fingerprint recognition module provided by the embodiment of the present disclosure, since the collection device is arranged in the first groove on the target surface of the transparent substrate, and the target surface is opposite to the fingerprint collection surface that is in contact with an external environment, contact between the collection device and the external environment is avoided. Thus, dustproof and waterproof performance of the fingerprint recognition module is improved.

An embodiment of the present disclosure further provides a display panel, including the fingerprint recognition module shown in any one of FIGS. 1 to 3. The fingerprint recognition module may include a substrate, a collection device and a fingerprint recognition circuit. The substrate includes a fingerprint collection surface and a target surface opposite to each other. The target face is provided with a face groove, and the collection device is located in the first groove. The fingerprint recognition circuit is electrically connected to the collection device, and is configured to collect information of a fingerprint on a side where the fingerprint collection face is located through the collection device.

Optionally, the substrate is a transparent substrate. The display panel includes a transparent cover plate configured to protect a structure inside the display panel. Exemplarily, the transparent cover plate may be a transparent glass cover plate. Moreover, the display panel may further include a base substrate and a device which is arranged on the base substrate and which is configured to implement a display function.

The transparent cover plate and the transparent substrate in the fingerprint recognition module may be formed as one piece. That is, the transparent substrate in the fingerprint recognition module may also be used as the transparent cover plate in the display panel. Thus, the overall thickness of the display panel is reduced, and the cost of the display panel is reduced.

An embodiment of the present disclosure further provides a display apparatus, including the above display panel. The display apparatus may be a liquid crystal panel, an electronic paper, an organic light-emitting diode panel, a mobile phone, a tablet computer, a TV, a display, a notebook computer, a digital photo frame, a navigator or any other product or member having a display function.

The embodiments of the fingerprint recognition module, the embodiments of the manufacturing method for the fingerprint recognition module, and the embodiments of the display panel, provided in the embodiments of the present disclosure can refer to one another, which is not limited in the embodiments of the present disclosure.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be understood that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A fingerprint recognition module, comprising: a substrate, a collection device and a fingerprint recognition circuit;
the substrate comprises a fingerprint collection surface and a target surface opposite to each other, the target surface is provided with a first groove, and the collection device is located in the first groove;
the collection device comprises a first electrode layer, a first insulation layer, a second electrode layer, a second insulation layer and an ink layer which are sequentially stacked in a direction away from the fingerprint collection surface; and
the fingerprint recognition circuit is electrically connected to the collection device, and is configured to collect information of a fingerprint on a side where the fingerprint collection surface is located through the collection device.

2. The fingerprint recognition module of claim 1, wherein the collection device is located at a bottom, in a direction towards the fingerprint collection surface, of the first groove.

3. The fingerprint recognition module of claim 2, wherein a maximum distance between the bottom, in the direction towards the fingerprint collection surface, of the first groove and the fingerprint collection surface is less than or equal to a maximum distance at which the collection device is capable of collecting fingerprint information.

4. The fingerprint recognition module of claim 1, wherein the fingerprint recognition circuit is located on the target surface.

5. The fingerprint recognition module of claim 1, wherein the target surface is provided with a second groove, and the fingerprint recognition circuit is located in the second groove.

6. The fingerprint recognition module of claim 1, wherein the fingerprint recognition circuit is located in the first groove.

7. The fingerprint recognition module of claim 6, wherein an orthographic projection of the fingerprint recognition circuit on the fingerprint collection surface is not overlapped with an orthographic projection of the collection device on the fingerprint collection surface.

8. The fingerprint recognition module of claim 1, wherein the first groove comprises a plurality of groove surfaces, and a joint of any two of the connected groove surfaces in the plurality of groove surfaces is provided with a first chamfer.

9. The fingerprint recognition module of claim 8, wherein the first chamfer is a circular-arc chamfer.

10. The fingerprint recognition module of claim 5, wherein the second groove comprises a plurality of groove surfaces, and a joint of any two of the connected groove surfaces in the plurality of groove surfaces is provided with a second chamfer.

11. The fingerprint recognition module of claim 10, wherein the second chamfer is a circular-arc chamfer.

12. The fingerprint recognition module of claim 3, wherein a thickness of the substrate is 0.5 mm, and the maximum distance between the bottom in the direction towards the fingerprint collection surface, of the first groove and the fingerprint collection surface is less than or equal to 0.3 mm.

13. The fingerprint recognition module of claim 1, wherein the substrate is a transparent substrate.

14. The fingerprint recognition module of claim 1, wherein the collection device is located at a bottom, in a direction towards the fingerprint collection surface, of the first groove, and a maximum distance between the bottom, in the direction towards the fingerprint collection surface, of the first groove and the fingerprint collection surface is less than or equal to a maximum distance at which the collection device is capable of performing fingerprint information collection;
the target surface is further provided with a second groove, and the fingerprint recognition circuit is located in the second groove;
the first groove comprises a plurality of groove surfaces, and a joint of any two of the connected groove surfaces in the plurality of groove surfaces is provided with a first chamfer, the first chamfer being a circular-arc chamfer; and
the second groove comprises a plurality of groove surfaces, and a joint of any two of the connected groove surfaces in the plurality of groove surfaces is provided with a second chamfer, the second chamfer being a circular-arc chamfer.

15. A manufacturing method for a fingerprint recognition module, the method comprising:
providing a substrate, the substrate comprising a fingerprint collection surface and a target surface opposite to each other;
forming a first groove on the target surface of the substrate;
arranging a collection device in the first groove, wherein the collection device comprises a first electrode layer, a first insulation layer, a second electrode layer, a second insulation layer and an ink layer which are sequentially stacked in a direction away from the fingerprint collection surface;
providing a fingerprint recognition circuit; and
electrically connecting the fingerprint recognition circuit to the collection device, the fingerprint recognition circuit being configured to collect information of a fingerprint on a side where the fingerprint collection surface is located through the collection device.

16. The method of claim 15, after providing the fingerprint recognition circuit, the method further comprises:
arranging the fingerprint recognition circuit on the target surface.

17. A display panel, comprising a fingerprint recognition module, the fingerprint recognition module comprises a substrate, a collection device and a fingerprint recognition circuit; the substrate comprises a fingerprint collection surface and a target surface opposite to each other, the target surface is provided with a first groove, and the collection device is located in the first groove;
the collection device comprises a first electrode layer, a first insulation layer, a second electrode layer, a second insulation layer and an ink layer which are sequentially stacked in a direction away from the fingerprint collection surface; and
the fingerprint recognition circuit is electrically connected to the collection device, and is configured to collect information of a fingerprint on a side where the fingerprint collection surface is located through the collection device.

18. The display panel of claim 17, wherein the substrate is a transparent substrate; and
the display panel comprises a transparent cover plate, and the transparent substrate and the transparent cover plate are formed as one piece.

19. A display apparatus, comprising the display panel of claim 17.

\* \* \* \* \*